INVENTOR.
JAMES H. MILLER
BY
Fay & Fay
ATTORNEYS

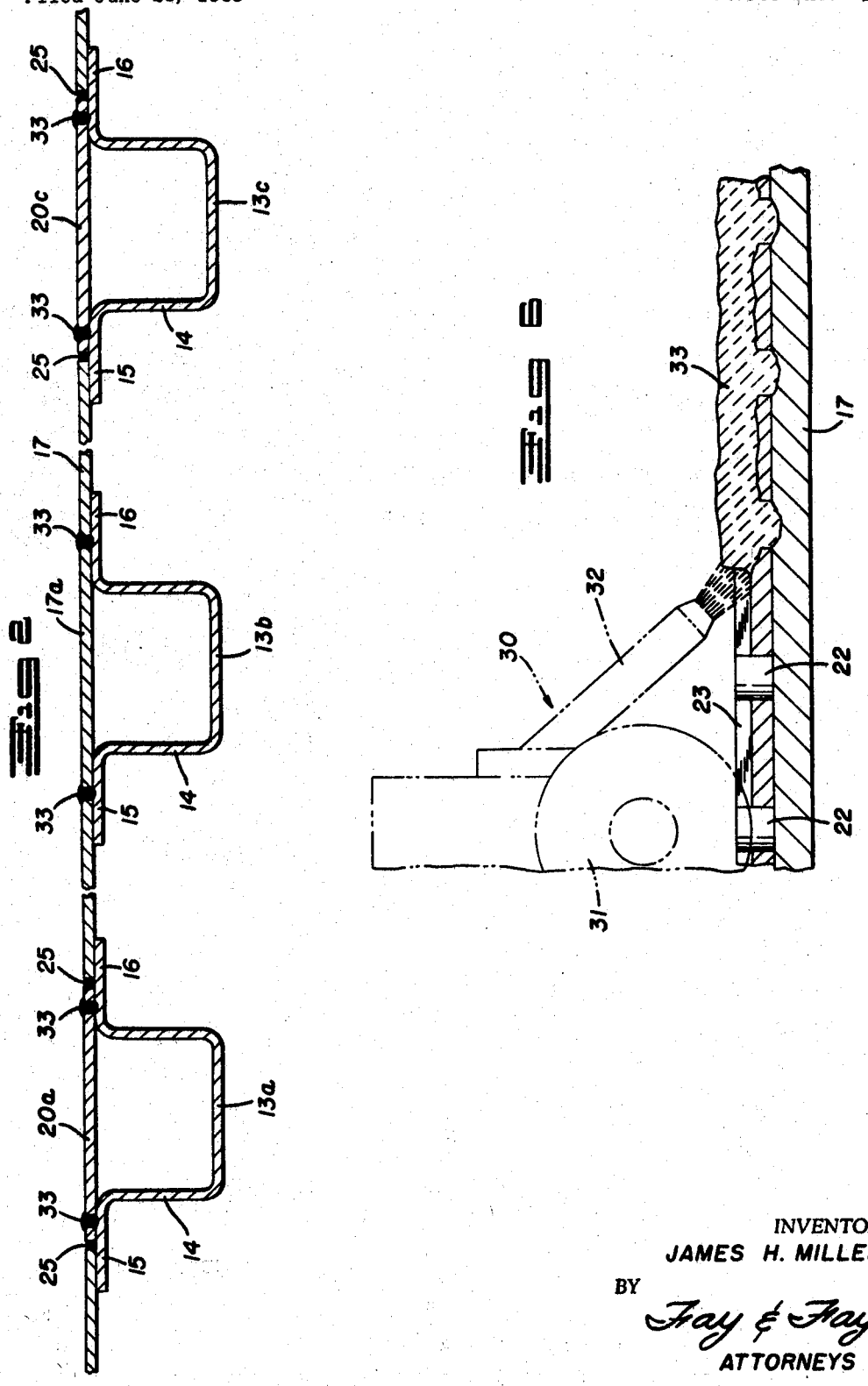

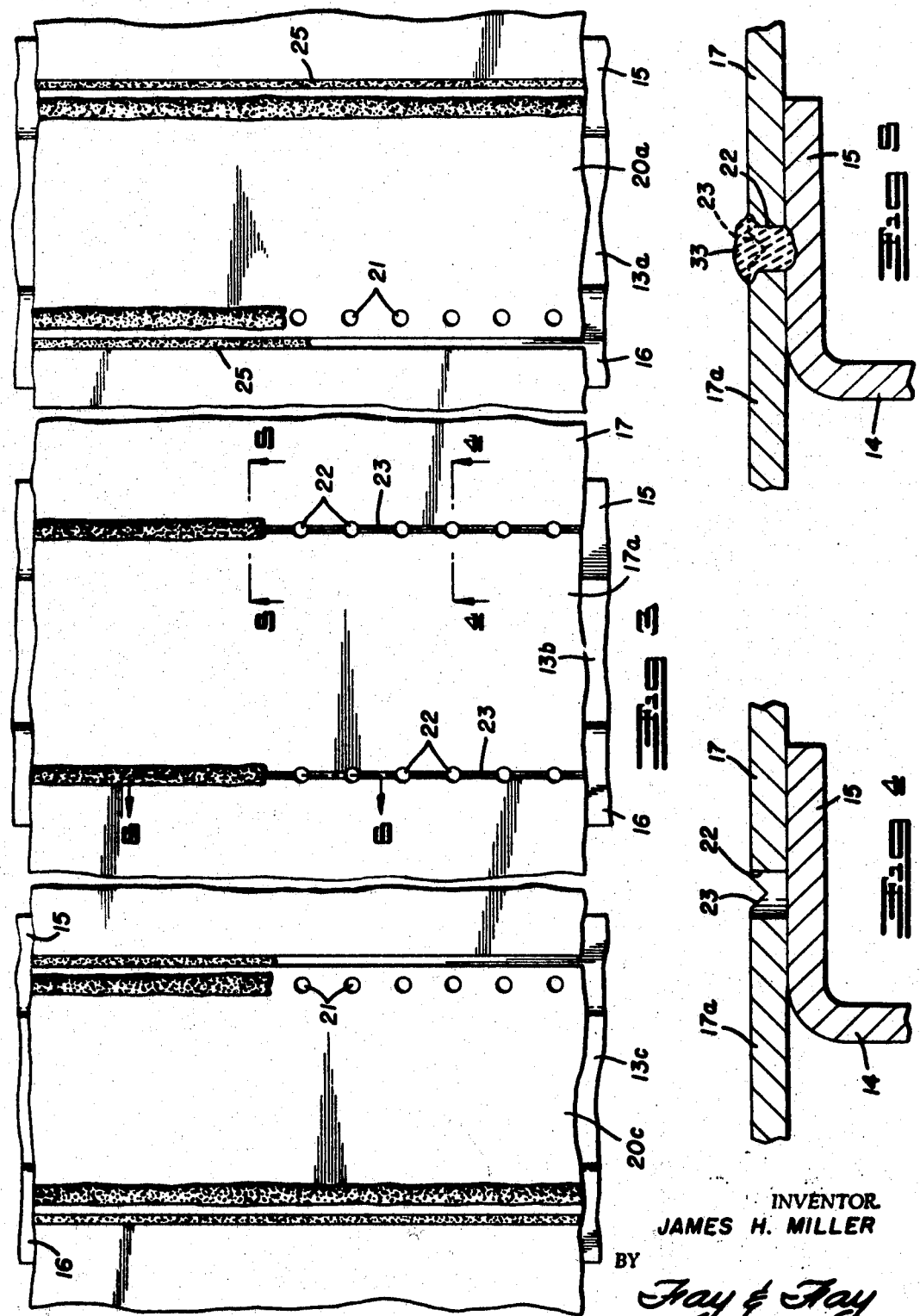

3,391,445
METHOD OF FABRICATING RAILROAD CAR SIDES
James H. Miller, Hubbard, Ohio, assignor to The Youngstown Steel Door Company, Cleveland, Ohio, a corporation of Ohio
Filed June 28, 1965, Ser. No. 467,316
4 Claims. (Cl. 29—471.1)

ABSTRACT OF THE DISCLOSURE

Disclosed is a method of fabricating a railroad car side having a single sheath side wall. The side wall includes a side sill and side plate with corner posts and intermediate posts to which the metal sheathing is welded. Splice sheets having rows of holes formed along their longitudinal edges are welded to alternate side posts, and side sheets, with holes formed in parallel rows spaced to overlie the post flanges of one post as they span the post, are butt welded to adjacent splice sheets. The welding operation includes the steps of forming a V-shaped groove along, and overlying, each of the rows of holes in said sheets to guide an automatic welder while it applies weld material along the rows of holes to provide welds extending through the holes and penetrating the flanges. Weld material is then applied to the edges of the splice sheets and adjacent side sheets.

---

Figure 1:
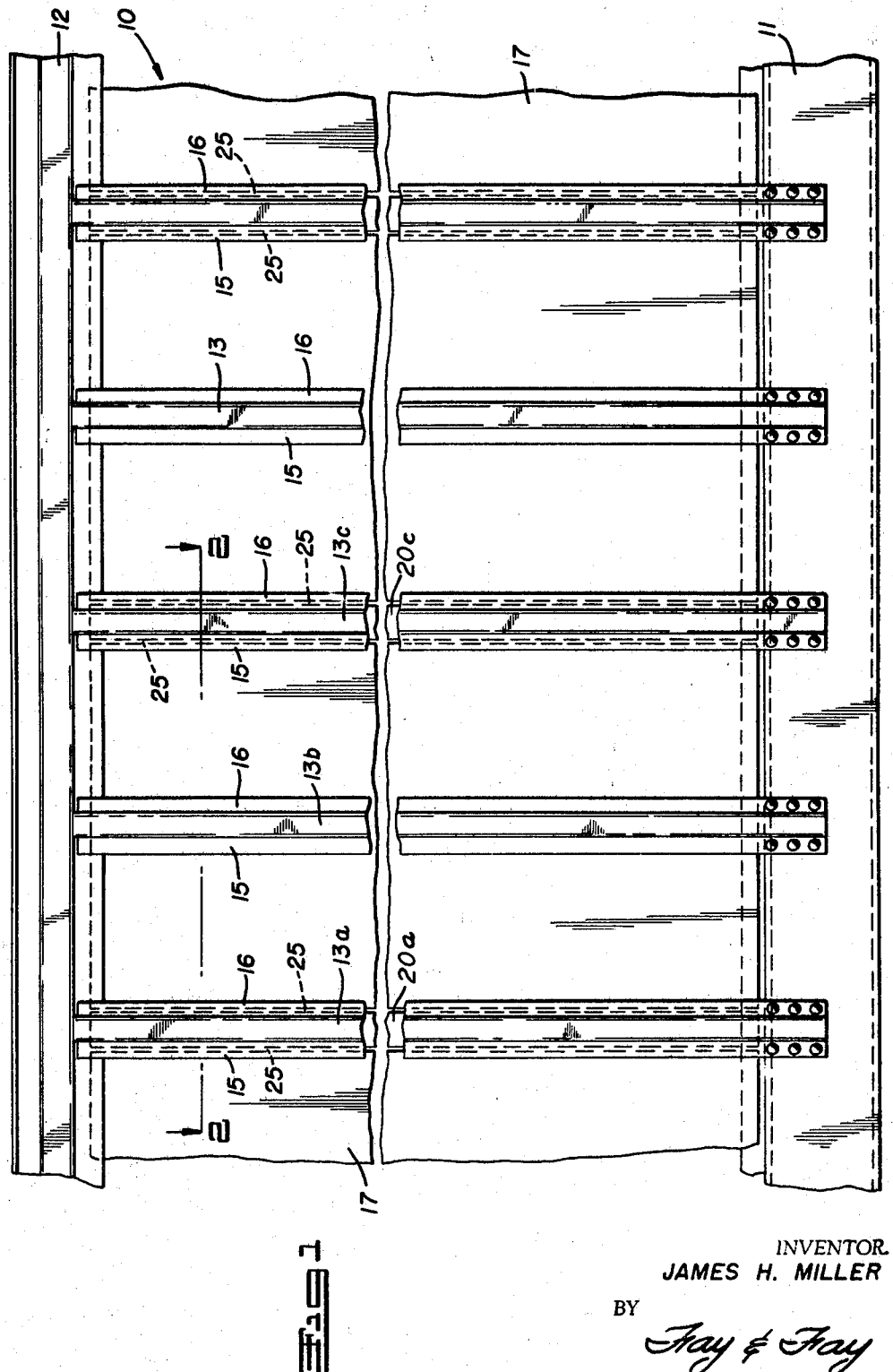

This invention relates to railroad car sides and more particularly to a novel method for assembling and welding such sides.

More specifically, this invention relates to the fabrication of a single sheath side wall for a railroad car which side wall includes a side sill and side plate with corner posts, intermediate posts, and sheathing welded to the posts.

It is a primary object of this invention to provide an improved method of welding the metal sheets to the posts.

It is a further object of this invention to provide a method wherein the sheets are automatically welded to the side posts with means formed in the sheets to facilitate the welding process.

More specifically, this invention contemplates a method of welding side sheets to the side wall posts which includes the provision of rows of apertures in the side sheets together with a V-shaped groove along each of the rows.

More particularly, this invention relates to a method of fabricating a car side which includes splice sheets welded to alternate ones of the side posts and side sheets butt welded to adjacent splice sheets, with each of the side sheets spanning one side post. Both the side sheets and the splice sheets are welded to their respective posts with the welds penetrating through rows of apertures formed in the sheets to assure the attachment of the sheets to the posts. The method further contemplates the forming of a groove along the rows of apertures in the side sheets with the guide roller of an automatic welder being received in the groove to guide the welder during the welding operation.

Other objects and features will become more apparent upon a complete reading of the following description which sets forth in detail but one approved method of carrying out the invention. Such disclosed method is not meant to be limiting, inasmuch as it constitutes but one of the various ways in which the principles of the invention may be employed.

In the drawings wherein like reference numerals indicate like parts in the various views:

FIG. 1 is a partial side elevation of a portion of a car side fabricated by the instant invention;
FIG. 2 is a section taken along line 2—2 of FIG. 1;
FIG. 3 is a partial side elevation showing the interior of the car side;
FIG. 4 is a section taken along lines 4—4 of FIG. 3;
FIG. 5 is a section taken along lines 5—5 of FIG. 3;
FIG. 6 is a sectional view illustrating the application of the weld material to one of the apertured sheets forming the car side.

Referring to the drawings and particularly FIG. 1 thereof, there is illustrated a car side, indicated generally by the numeral 10, which includes a side sill 11 and an upper side plate 12. Secured, as by rivets, to the side sill 11 and side plate 12 are vertically extending side posts 13. As best illustrated in FIG. 2, these posts are hat-shaped in cross-section and include a generally U-shaped body 14 with side flanges 15, 16 extending from either leg of the body. The side wall is completed by side sheets of metal sheathing 17 which are secured in position spanning the posts 13 to provide an enclosure for the railroad car.

Illustrated in FIG. 2 is a cross-section through the side wall of FIG. 1. The particular section shown in FIG. 2 illustrates three of the side posts indicated by the numerals 13a, 13b and 13c. The posts 13a and 13c have a small splice sheet 20a and 20c respectively which sheets extend vertically along the posts and span the gap defined by the U-shaped body sections of the posts. As shown in FIG. 2, the side sheet 17a spans the post 13b with the outer vertical edges thereof abutting the adjacent vertical edges of the splice sheets 20a and 20c.

The advantage of this arrangement is that metal sheets are readily purchased in certain predetermined widths and these widths ordinarily permit only the spanning of one post. In order to facilitate the production of a side wall and avoid the necessity of piecing together sheets of metal to span the posts, it has been found desirable to sub-assemble these splice sheets on alternate ones of the posts and then cut the metal sheets to fit in the manner shown in FIG. 2. Moreover, lading band anchors are more readily formed in a relatively small sheet such as the splice sheet.

It is also advantageous to subassemble the corner posts, which are not shown, with the vertical margin of the last side sheet comprising the side wall.

In attaching the splice sheets to their respective posts, apertures 21, as shown in FIG. 3, are placed in spaced apart vertical rows along the projected path of the weld. By this technique, it is assured that the weld material will penetrate the sheet into the post at least in the area of the aperures and thereby assure securement of the splice sheets to the posts. In a similar fashion, the side sheets 17 are each provided with a plurality of holes or apertures 22 in two spaced vertical rows as illustrated in FIG. 3. These apertures perform a function similar to the apertures 21 in the splice sheets 20. In addition, a V-shaped groove is designated at 23 and is formed along the rows of apertures in the sheets 17. The groove 23 provides a guide for an automatic welding machine as illustrated in FIG. 6 thereby assuring the accuracy of the location of the weld as the welding machine traverses the sheet.

It is contemplated that the apertures in each of the sheets may be applied in one operation and that after the apertures have been placed in the sheets 17, a brake press employing a die will score the sheets to form the two grooves 23.

The weld material illustrated in FIG. 6 is shown as not penetrating the sheet 17. However, the weld may in fact penetrate deeper than shown. In any event, the apertures 22 assure that sufficient weld material passes through the sheet into the flanges of the side posts to secure the sheets to the posts.

In assembling the side wall, it is contemplated that the subassemblies comprising the posts with their associated splice sheets, together with the subassembled corner post, will be placed in a jig or frame. Additional posts such as 13b will be placed in the frame between the subassembled posts. Side sheets 17 may then be lowered onto the frame overlying the posts 13b. The edges of the sheets 17 will rest on the adjacent flanges of the side posts such as 13a and 13c in contiguous relationship with the side edges of the splice sheets. A butt weld 25 is applied at the contiguous edges of the sheets 17 and the splice sheets 20 with the butt weld securing the edges of the two sheets to the side posts. Welds would then be applied to the rows of apertures 22. In applying the weld, an automatic welder would be utilized such as that which is shown schematically in FIG. 6. Thus, the welder would include a guide roller 31 which is receivable in the groove 23 to accurately located the welder relative to the work piece. Also schematically shown is the welding apparatus 32 which, with the guide roller 31 in the groove 23, is accurately positioned over the rows of holes. It will be apparent that the method contemplates the positioning of the guide roller 31 in the first of the grooves 23 with a subsequent pass of the welder applying the weld material 33 to the metal sheet. The welder would then be repositioned over the second row of holes and a second pass made to complete the securement of each side sheet to both of the flanges on the side post.

It is readily apparent that with the technique of apertures in the sheets formed by piercing, punching or a similar technique, together with guide grooves along the row of apertures, an improved method of accurately and securely welding side sheets to the side posts of a railroad car has been devised. Modifications and changes in this method will suggest themselves to those having ordinary skill in the art. Changes such as these are contemplated by the principles of this invention so that although for ease of description, the principles of the invention have been set forth in connection with but a single method, it is my desire to be restricted only by the scope of the appended claims.

I claim:

1. A method of fabricating a side wall for a railroad car comprising the steps of:

providing a plurality of spaced apart side posts which include a U-shaped body with oppositely directed flanges on the legs thereof;

forming a plurality of splice sheets having a width sufficient to span the gap defined by the U-shaped body of the side posts;

forming a row of holes along the longitudinal edges of the splice sheets;

positioning a splice sheet on every other one of said posts with the sheet spanning the gap in the post and the rows of holes overlying the flanges;

applying weld material along the rows of holes thereby securing each of said splice sheets to its associated post;

providing side sheets each having a width sufficient to span every other post;

forming holes in the side sheets in parallel rows, with the rows being spaced a distance greater than the gap defined by the U-shaped body of the posts but less than the distance between the extremities of the flanges on said posts;

said rows of holes in said side sheet being positioned approximately mid-width thereof;

forming a V-shaped groove along and overlying each of the rows of holes in said side sheets;

placing each side sheet on a post between the subassembled splice sheets, with the holes in each sheet overlying the flanges of the post and the edges of the side sheets being contiguous to the edges of the splice sheets;

welding the edges of each side sheet to the adjacent edges of a splice sheet; and sequentially positioning the roller of an automatic welder in each groove and actuating the welder to apply weld material over the rows of holes, thereby securing said side sheets to the underlying posts.

2. A method of fabricating a side wall for a railroad car comprising the steps of:

providing a plurality of spaced apart side posts, each of which includes a U-shaped body with oppositely directed flanges on the legs thereof;

forming a plurality of splice sheets each having a width sufficient to span the gap defined by the U-shaped body;

forming a row of holes along the longitudinal edges of each of the splice sheets;

positioning a splice sheet on every other one of said posts with the sheet spanning the gap in the post and the rows of holes overlying the flanges;

applying weld material along the rows of holes thereby securing each of said splice sheets to the flanges of its associated posts;

providing side sheets each having a width sufficient to span every other post;

positioning each side sheet on a post not having a splice sheet with the edges of the side sheet being contiguous to the edges of the splice sheets;

welding the edges of each side sheet to the adjacent edges of a splice sheet; and securing each side sheet to its associated underlying post.

3. A method of fabricating a side wall for a railroad car comprising the steps of:

providing a plurality of spaced apart side posts each of which includes a U-shaped body with oppositely directed flanges on the legs thereof;

forming a plurality of splice sheets each having a width greater than the width of the gap defined by the U-shaped body but less than the distance between the extremities of said flanges;

positioning a splice sheet on every other one of said posts with the sheet spanning the gap in the post;

securing each of said splice sheets to its associated posts;

providing side sheets each having a width sufficient to span every other post;

forming holes in the side sheets in parallel rows, with the rows being spaced a distance greater than the gap defined by the U-shaped body of the posts but less than the distance between the extremities of the flanges on said posts;

said rows of holes in said side sheets being positioned approximately mid-width thereof;

forming a V-shaped groove along and overlying each of the rows of holes in said side sheets;

placing each side sheet on a post between the subassembled splice sheets, with the holes in each side sheet overlying the flanges of the post and the edges of the side sheets being contiguous to the edges of the splice sheets;

welding the edges of each side sheet to the adjacent edges of a splice sheet; and sequentially positioning the roller of an automatic welder in each groove and actuating the welder to apply weld material over the rows of holes, thereby securing said side sheets to the underlying posts.

4. A method of fabricating a side wall for a railroad car comprising the steps of:

providing a plurality of spaced apart hat-shaped side posts;

forming a plurality of splice sheets each having a width sufficient to span the gap in the post;

positioning a splice sheet on every other one of said posts with the sheet spanning the gap therein;

securing each of said splice sheets to its associated post;

providing side sheets each having a width sufficient to span every other post;

placing each side sheet on a post between the post having the splice sheets with the edges of the side sheets being contiguous to the edges of the splice sheets;

securing the adjacent edges of said side and splice sheets; and securing each of said side sheets to its underlying post.

References Cited
UNITED STATES PATENTS

| | | | |
|---|---|---|---|
| 1,290,091 | 1/1919 | Cole | 29—447 X |
| 1,760,955 | 6/1930 | Moss | 287—20.2 X |
| 2,273,736 | 2/1942 | Raymond et al. | 29—446 X |
| 1,268,980 | 6/1918 | Krumholz | 287—189.36 |
| 1,810,005 | 6/1931 | Burnish | 29—483 X |
| 2,041,407 | 5/1936 | Gilpin | 105—406 X |
| 2,140,268 | 12/1938 | Moss | 105—406 X |
| 2,156,778 | 5/1939 | Duryea | 105—409 |
| 2,164,074 | 6/1939 | Moses et al. | 29—471.3 |
| 2,746,789 | 5/1956 | Ridgway | 287—189.36 |
| 2,892,071 | 6/1959 | Kitrell | 219—125 |

JOHN F. CAMPBELL, *Primary Examiner.*

J. L. CLINE, *Assistant Examiner.*